Figure 1:
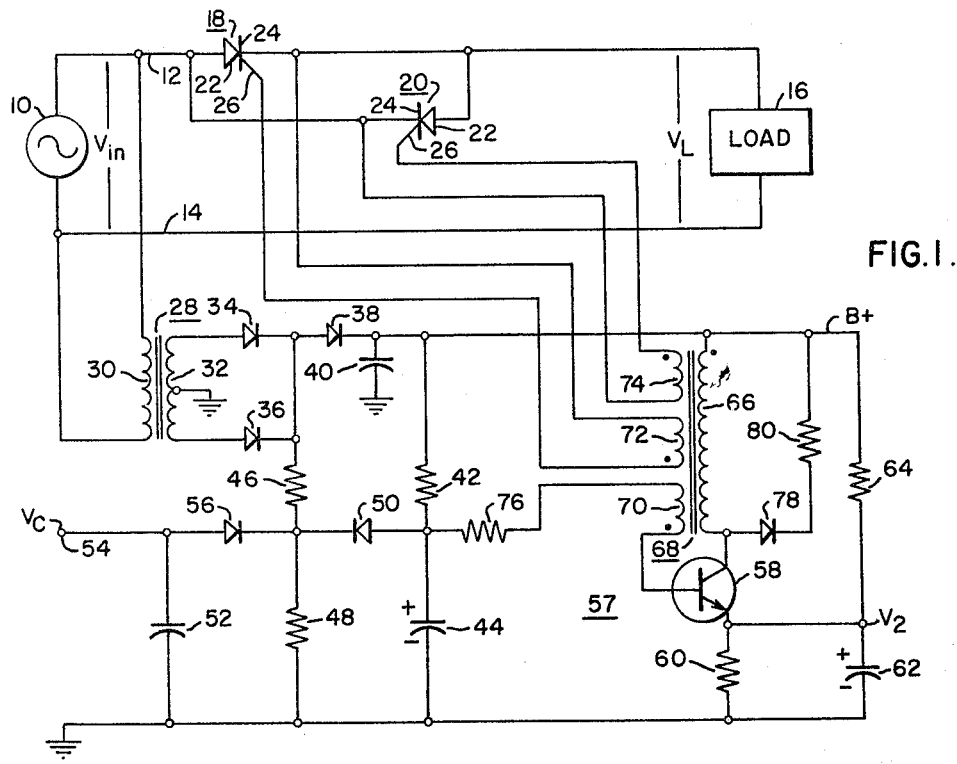

May 14, 1968    L. C. VERCELLOTTI ET AL    3,383,623
PULSE GENERATORS FOR PHASE CONTROLLED SYSTEMS
Filed Oct. 28, 1964    3 Sheets-Sheet 1

INVENTORS
Leonard C. Vercellotti &
Richard A. Johnson.
BY
*Brodahl*
ATTORNEY ial Pent Office 3,383,623
Patented May 14, 1968

3,383,623
PULSE GENERATORS FOR PHASE
CONTROLLED SYSTEMS
Leonard C. Vercellotti, Penn Hills Township, Verona, and Richard A. Johnson, Monroeville, Pa., assignors to Westinghouse Electric Corporation, East Pittsburgh, Pa., a corporation of Pennsylvania
Filed Oct. 28, 1964, Ser. No. 407,162
17 Claims. (Cl. 331—112)

This invention relates to pulse generating circuitry, and more particularly to apparatus for generating a train of pulses during each half cycle of an alternating current voltage, the apparatus incorporating means for controlling the phase of the first pulse in each train with respect to the starting point of each half cycle of the alternating current voltage.

While not limited thereto, the present invention is particularly adapted for use in alternating current phase control systems employing controlled semiconductive rectifiers which, as is well known, are similar in operation to thyratrons. Such systems have found widespread use in controlling power supplied to an electrical load from an alternating current source and include, as essential circuit components, controlled silicon rectifiers or the like which are cut off at the beginning of a cycle of the alternating current source, but which are gated on after a predetermined time delay in each half cycle whereby the rectifiers will deliver to the load only a selected part of the available power. Control is obtained by varying an input voltage or impedance such that the power supplied to the load is proportional to the input.

The present invention is concerned with phase control systems wherein controlled semiconductive rectifiers are fired in timed relationship with respect to the starting point of an alternating current voltage by a pulse train; and, as an overall object, the invention provides new and improved circuitry for generating a firing pulse waveform for controlled semiconductive rectifiers whereby proportional control may be obtained in a power supply system.

Another object of the invention is to provide circuitry for generating a firing waveform for controlled semiconductive rectifiers which produces a non-distributed gate pulse train, meaning that the gate pulse train is repeated during each half cycle of the input alternating current source.

Another object of the invention is to provide circuitry for generating non-distributed gate pulse trains in a phase control system, which circuitry utilizes an oscillator in which the base drive is drawn from a capacitor and discharged during each half cycle of the input alternating current source.

A further object of the invention is to provide circuitry for generating a firing waveform for controlled semiconductive rectifiers which is simple and economical in construction.

Still another object of the invention is to provide circuitry of the type described employing transistors and semiconductive diodes, and incorporating means to compensate for temperature variations in the diodes and transistors, thereby insuring a direct correlation between an input control voltage or impedance and the power delivered to a load.

The subject matter of this application is closely related to that described and claimed in copending application Ser. No. 388,845, filed Aug. 11, 1964, now Patent No. 3,333,112 and assigned to the assignee of the present application. The present invention, however, incorporates refinements and improvements, hereinafter described in detail, which materially improve the performance of the system of the earlier-filed application.

Figure 2:
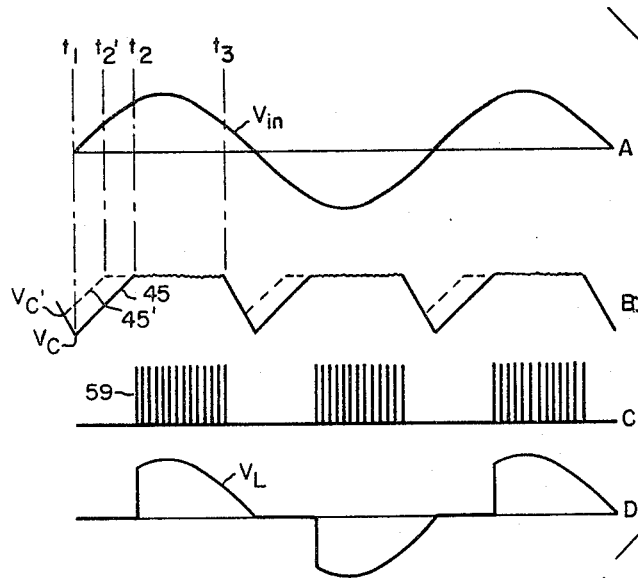
Figure 3:
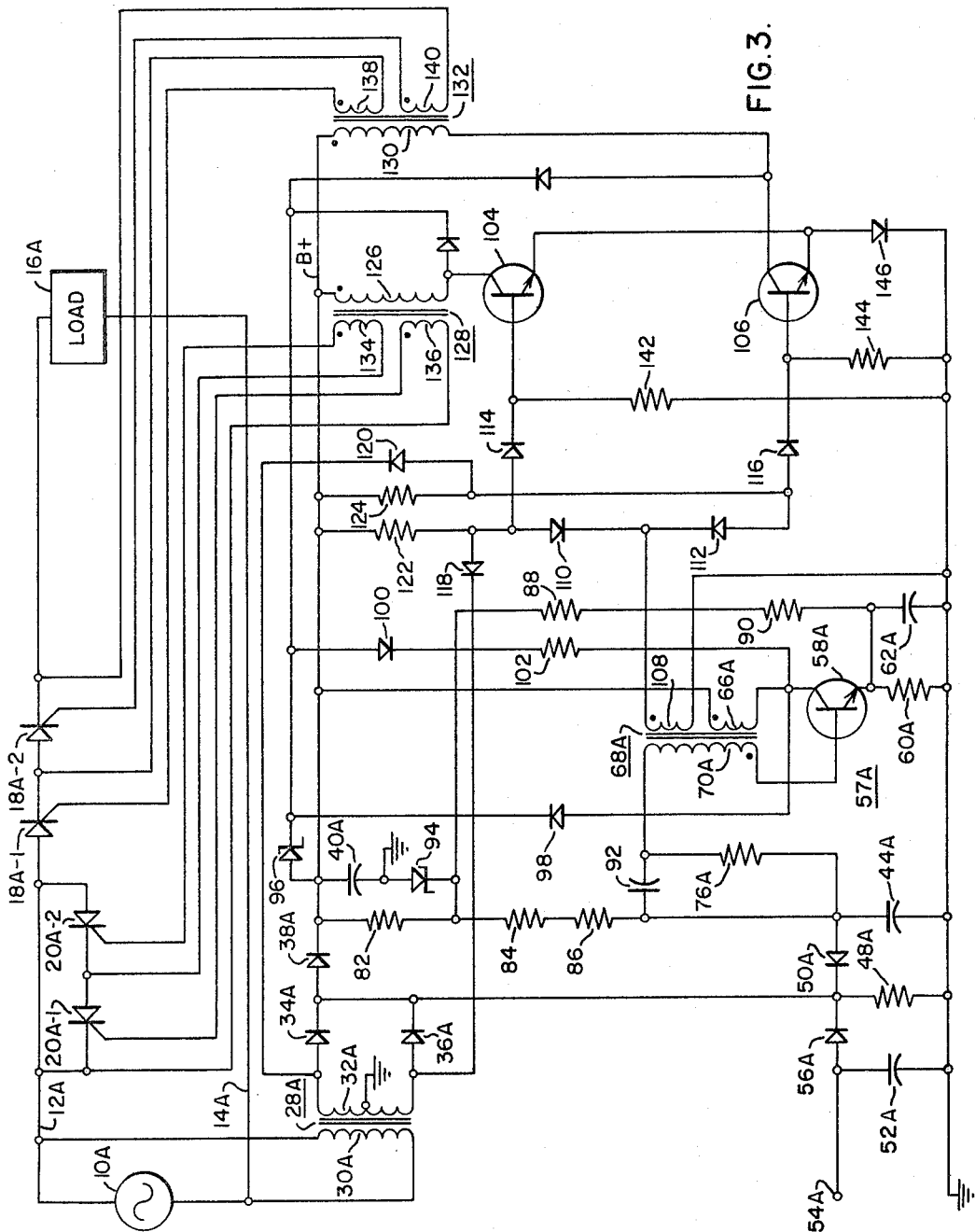
Figure 4:
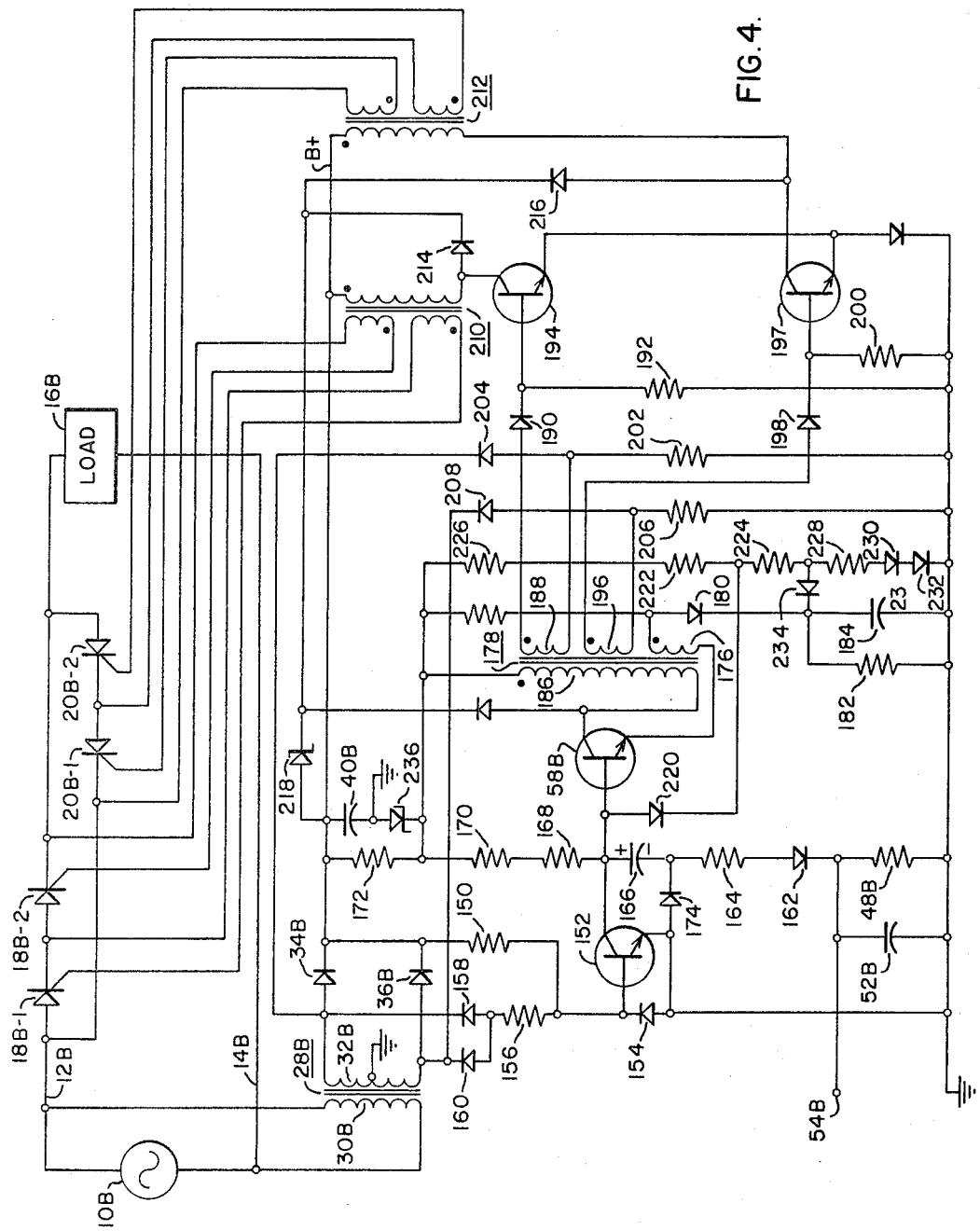

The above and other objects and features of the invention will become apparent from the following detailed description taken in connection with the accompanying drawings which form a part of this specification, and in which:

FIGURE 1 is a schematic circuit diagram of one embodiment of the invention;

FIG. 2 comprises a series of waveforms illustrating the operation of the circuit of FIG. 1;

FIG. 3 is a schematic circuit diagram of another embodiment of the invention wherein two transistors are employed as output buffer stages which amplify the pulse trains used to fire semiconductive controlled rectifiers on alternate half cycles of an alternating current voltage; and FIG. 4 is a schematic circuit diagram of still another embodiment of the invention in which charging and discharging of the main ramp control capacitor is through a semiconductive switch.

Referring now to the drawings, and particularly to FIG. 1, a power supply system is shown including a source of alternating current voltage 10 connected through conductors 12 and 14 to a load 16. Included in conductor 12 is a first silicon controlled rectifier 18; and in shunt with rectifier 18 is a second silicon controlled rectifier 20 arranged to conduct current in a direction opposite to the current passing through rectifier 18.

As is well known to those skilled in the art, the silicon controlled rectifiers 18 and 20 are the equivalents of thyratrons. Each rectifier includes an anode 22, cathode 24 and a gate electrode 26. Furthermore, each silicon controlled rectifier 18, 20 acts as a two-terminal switch and will block current flow in either direction until a critical break-over voltage is exceeded or until a voltage, positive with respect to cathode 24, is applied to its gate electrode 26. By applying positive pulses to the gate electrodes 26 during the positive and negative half cycles of the alternating current voltage source 10 in delayed time relationship with respect to the zero crossings of the alternating current waveform, a portion of the power form source 10 will be applied to the load 16, which portion is dependent upon the time delay.

The circuitry for applying pulses to the gate electrodes 26 in timed relationship with respect to the zero crossings of the alternating current waveform includes a transformer 28 having its primary winding 30 connected across the output of alternating current voltage source 10, substantially as shown. The secondary winding 32 of transformer 28 is center tapped to ground and has its opposite ends connected through diodes 34 and 36 to the anode of diode 38. The cathode of diode 38 is connected through capacitor 40 to ground; and it will be appreciated that the arrangement just described comprises a full-wave rectifier.

The rectified voltage at the cathode of diode 38, comprising a B+ votlage source, is applied through resistor 42 to charge a ramp capacitor 44 with the polarity shown. The cathodes of diodes 34 and 36 are connected to ground through serially-connected resistors 46 and 48; while the junction of these resistors is connected through diode 50 to the positive treminal of ramp capacitor 44. An input control voltage is applied across capacitor 52 between input terminal 54 and ground, the terminal 54 being connected to the junction of resistors 46 and 48 through diode 56.

The pulse trains used to fire the semiconductive controlled rectifiers 18 and 20 are generated by means of a blocking oscillator 57 which includes an NPN transistor 58 having its emitter connected to ground through the parallel combination of resistor 60 and capacitor 62. The emitter of transisotr 58 is also connetced to the B+ voltage source at the cathode of diode 38 through resistor 64. In this respect, it will be appreciated that the quiescent or normal voltage level on the emitter of transistor 58 is dependent upon the relative magnitudes of resistors 60 and 64 comprising a voltage divider connected between the B+ voltage source and ground. The collector of transistor 58 is connected through the primary winding 66 of a coupling transformer 68 to the B+ voltage source at the cathode of diode 38. Transformer 68 includes three secondary windings 70, 72 and 74. Windings 72 and 74 are connected between the gate electrodes and cathodes of silicon controlled rectifiers 18 and 20, respectively, and are wound such that the pulses produced when the transistor 58 conducts initiate conduction in the rectifiers. That is, the pulses applied to the gate electrodes are positive with respect to the cathodes. One end of secondary winding 70 is connected to the base of transistor 58 as shown, while its other end is connected through resistor 76 to the junction of capacitor 44 and resistor 42. In shunt with the primary winding of transformer 68 are a diode 78 and resistor 80, in series, which clamp the collector of transistor 58 at the B+ voltage level established at the cathode of diode 38. In this manner, the diode 78 and resistor 80 serve to dissipate any inductive energy stored in the primary winding 66, which stored energy would otherwise build up and alter the performance characteristics of the circuit.

Operation of the circuit of FIG. 1 may best be understood by reference to FIG. 2 where waveform A illustrates the output sinusoidal waveform of voltage source 10. At the zero crossings of the voltage source 10 (i.e., time $t_1$ in the first half cycle) the voltage across resistor 48 is essentially the control voltage $V_C$ minus the diode drop of diode 56. At this time, capacitor 44 is discharged through diode 50 to an initial voltage essentially equal to $V_C$. This is shown in waveform B of FIG. 2 illustrating the voltage across capacitor 44. As the alternating current voltage increases above or below the zero axis during each half cycle, diodes 50 and 56 become reverse biased and capacitor 44 is charged positively toward the B+ supply through resistor 42. This is shown in waveform B of FIG. 2 where the voltage across the capacitor rises along the slope 45. When the voltage across the capacitor 44 exceeds the voltage $V_2$ at the emitter of transistor 58 by the forward base-emitter drop of the transistor, it starts to conduct and is aided in conduction by the positive feedback voltage across winding 70. Conduction continues until capacitor 62 is charged by an amount equal to the positive feedback voltage of winding 70. When this occurs, transistor 58 begins to block and is aided in switching by feedback winding 70. Positive feedback through secondary winding 70 of transformer 78 pulls current out of capacitor 44 providing additional base current to saturate transistor 58. Transistor 58 remains blocked until capacitor 62 is discharged and capacitor 44 is recharged to a point where transistor 58 is once again forward biased. Consequently, oscillator 57 produces pulses 59 (waveform C in FIG. 2) to fire the silicon controlled rectifier 18, for example. The resulting load voltage $V_L$ is shown as waveform D in FIG. 2.

The foregoing process is, of course, repeated during each half cycle of the input voltage $V_{in}$. Let use assume, now, that the control voltage is increased to the level $V_C'$ in FIG. 2. The capacitor 44 will now charge from this higher voltage level along the slope 45' shown in dotted outline on waveform B. As can be seen, the voltage on the capacitor will now exceed $V_2$ by the base-emitter drop of transistor 58 at time $t_2'$, which is before $t_2$, in each half cycle. The result is that oscillations will be produced earlier in each half cycle in waveform C, and more power will be delivered to the load. Similarly, a decrease in the control voltage $V_C$ will result in a decrease in the power supplied to the load.

The control voltage $V_C$ may be obtained from a direct current control voltage signal directly or may be obtained from a votlage divider consisting of an external sensor impedance and reference potentiometer in accordance with well known principles.

With reference, now, to FIG. 3, another embodiment of the invention is shown which is somewhat similar in construction and operation to the embodiment of FIG. 1, but which provides a fairly high input impedance for the direct current control voltage while providing sufficient power to drive the output stages. As in the embodiment of FIG. 1, a source of alternating current voltage 10A is connected through leads 12A and 14A to a load 16A. In this case, however, two semiconductive controlled rectifiers 18A–1 and 18A–2 are connected in series in the power lead 12A. In shunt with these rectifiers are a second pair of series connected semiconductive controlled rectifiers 20A–1 and 20A–2 connected with reverse polarity with respect to rectifiers 18A–1 and 18A–2.

The output of voltage source 10A is applied across the primary winding 30A of transformer 28A. The secondary winding 32A is center tapped with the center tap connected to ground as shown. Opposite ends of the winding 32A are connected through diodes 34A and 36A to the anode of diode 38A, the cathode of this diode being connected to ground through capacitor 40A. The cathodes of diodes 34A and 36A are connected to ground through resistor 48A having its high potential side connected thorugh diode 56A to input terminal 54A, and through diode 50A to the high potential side of ramp capacitor 44A. Connected in shunt between the input terminal 54A and ground is a capacitor 52A corresponding to capacitor 52 shown in FIG. 1.

Between the cathode of diode 38A and the cathode side of Zener diode 94 is a resistor providing sufficient current to maintain a Zener reference voltage at the cathode of Zener diode 94. Connected to the junction of resistors 82 and 84 is a current path including resistors 88 and 90 in series with capacitor 62A corresponding to capacitor 62 in FIG. 1. Resistor 60A is connected in shunt with capacitor 62A, the parallel combination of elements 60A and 62A being connected to the emitter of transistor 58A as in the embodiment of FIG. 1. Series resistors 84 and 86 perform the function of resistor 42 in FIG. 1 providing a source of current to charge ramp capacitor 44A. The base of transistor 58A is connected through a secondary winding 70A on coupling transformer 68A and resistor 76A to the high potential side of capacitor 44A. Connected in shunt with resistor 76A is a capacitor 92, which acts as a by-pass around resistor 76A and serves to speed up the response of the circuit. Zener diode 94 acts to regulate the voltage source and eliminate variations in the characteristics of the circuit due to line voltage variations. Similarly, Zener diode 96 serves to clamp the collector of the same transistor at a preset voltage above the supply voltage through diode 98 when transistor 58A blocks after conducting. Thus, a means is provided for dissipating the inductive energy stored in the primary winding 66A, which stored energy would otherwise build up and alter the performance of the circuit.

It will be appreciated that the circuitry thus far described is very similar to that of FIG. 1 with the capacitor 44A being charged on each half cycle of the input alternating current source. The voltage level to which the capacitor 44A is reset is again controlled by the control voltage applied between input terminal 54A and ground. The oscillations produced by transistor 58A, however, are not applied directly to semiconductive controlled rectifiers in the power circuit. Rather, they are utilized to control two amplifying transistors 104 and 106 on alternate half cycles. Thus, output pulses from the blocking oscillator 57A are derived across secondary winding 108 and applied to the cathodes of two diodes 110 and 112. The anode of diode 110 is connected through diode 114 to the base of NPN transistor 104. In a similar manner, the anode of diode 112 is connected through diode 116 to the base of NPN transistor 106.

The junction of diodes 110 and 114 is connected through diode 118 to one end of the secondary winding 32A on transformer 28A. Likewise, the junction of diode 112 and 116 is connected through diode 120 to the other side of the secondary winding 32A. The anodes of diodes 118 and 120 are connected through resistors 122 and 124, respectively, to the B+ voltage source at the cathode of diode 38. With the arrangement shown, diode 114 will be biased to permit pulses to pass to the base of transistor 104 on one-half cycle of the input alternating current source; whereas diode 116 will be biased to pass pulses from the same winding 108 to the base of transistor 106 on the other half cycle of the alternating current source. Consequently, the pulse train will be induced across the primary winding 126 of transformer 128 during one-half cycle of the input alternating current source; whereas the pulse train will be produced in the primary winding 130 of transformer 132 on the other half cycle. The pulse train induced in the primary winding 126 appears across the secondary windings 134 and 136; and the pulse train is applied to the serially-connected semiconductive controlled rectifiers 20A-1 and 20A-2 during one-half cycle to render them conducting. On the other half cycle, the pulse train induced in the secondary windings 138 and 140 of transformer 132 is applied to the serially-connected semiconductive controlled rectifiers 18A-1 and 18A-2 to render them conducting. Thus, the transistors 104 and 106 act as amplifiers for the oscillations produced by the oscillator 57A. The base of transistor 104 is connected to ground resistor 142; and the base of transistor 106 is connected to ground through resistor 144. These resistors assure negative bias on the bases of transistors 104 and 106 when a positive pulse is not being applied to the bases of these transistors. The emitters of both transistors 104 and 106 are connected to ground through diode 146.

With reference, now, to FIG. 4, still another embodiment of the invention is shown which again includes a source of alternating current voltage 10B connected through leads 12B and 14B to a load 16B. Included in the lead 12B are serially-connected semiconductive controlled rectifiers 18B-1 and 18B-2. In shunt with the rectifiers 18B-1 and 18B-2 are a second pair of serially-connected controlled semiconductive rectifiers 20B-1 and 20B-2 arranged to conduct current in a direction opposite to that conducted by the first-mentioned rectifiers.

The alternating current voltage source 10B is applied to the primary winding 30B of input transformer 28B having its secondary winding 32B center tapped and connected to ground as shown. The opposite ends of the secondary winding 32B are connected through diodes 34B and 36B to capacitor 40B having its other side connected to ground, substantially as shown. The cathodes of diodes 34B and 36B are also connected through resistor 150 to the base of an NPN transistor 152. The base of this same transistor is connected to ground through diode 154, and to the anodes of diodes 34B and 36B through resistor 156 and diodes 158 and 160, respectively. With this arrangement, current will flow on one-half cycle of the alternating current source 10B through diode 34B, resistor 150, resistor 156 and diode 160. On the other half cycle, current will flow through diode 36B, resistor 150, resistor 156 and diode 158. This establishes a set voltage on the base of transistor 152 determined by the relative magnitudes of resistors 150 and 156 which act as a voltage divider.

Transistor 152 will conduct when the voltage on its base is more positive with respect to that on its emitter by its base-emitter drop. When transistor 152 conducts, ramp capacitor 166 is discharged by transistor 152 through diode 174. When transistor 152 blocks, the positive side of ramp capacitor 166 is pulled positive through resistor 169 and 170 until the negative side of the capacitor 166 is clamped to the control voltage applied at 54B through resistor 164 and diode 162. Ramp capacitor 166 then begins to be charged by the current provided through resistors 168 and 170. The initial setting at the negative side of capacitor 166 is a function of the control voltage applied between input terminal 54B and ground.

As the capacitor 166 charges during each half cycle of the input alternating current source, the voltage on the base of transistor 58B will reach the point where it exceeds that on its emitter by the base-emitter drop of the transistor. The emitter is connected to ground through winding 176 on transformer 178, diode 180 and the parallel combination of resistor 182 and capacitor 184. When transistor 58B conducts, the resulting voltage across the primary winding 186 of transformer 178 induces a positive feedback voltage across winding 176 to aid in the forward biasing of transistor 58B and its ultimate switching into saturation. The conduction time of transistor 58B is determined by the charging of capacitor 184 to the positive feedback voltage of winding 176. When this occurs, transistor 58B begins to cut off and is aided in switching by the positive feedback winding 176. The transistor will conduct again when capacitor 184 discharges to a point where transistor 58B is once again forward biased.

The pulses induced in the secondary winding 188 of transformer 178 are applied through diode 190 and resistor 192 to the base of NPN transistor 194. In a similar manner, pulses induced in the secondary winding 196 of transformer 178 are applied through diode 198 and resistor 200 to the base of NPN transistor 197. The end of winding 188 opposite diode 190 is connected to ground through resistor 202 and to the anode of diode 34B through diode 204. In a similar manner, the end of secondary winding 196 opposite diode 198 is connected to ground through resistor 206 and to the anode of diode 36B through diode 208. With this arrangement, positive pulses will be applied to the base of transistor 194 during one-half cycle of the input alternating current sources; while positive pulses will be applied to the base of transistor 197 during the other half cycle. The pulses applied to transistor 194 are amplified and applied through transformer 210 to the semiconductive controlled rectifiers 18B-1 and 18B-2 to render them conducting. Similarly, the pulses applied to the base of transistor 197 are amplified and applied through transformer 212 to the semiconductive controlled rectifiers 20B-1 and 20B-2. Thus, during one-half cycle of the input alternating current source, rectifiers 18B-1 and 18B-2 will conduct; while on the other half cycle rectifiers 20B-1 and 20B-2 will conduct. The period of conduction of each pair of rectifiers is, of course, dependent upon the period of oscillation of transistor 58B which, in turn, is dependent upon the control voltage applied between input terminal 54B and ground in the manner described above.

In the circuit of FIG. 4, diodes 214 and 216 are connected to the B+ voltage source at the cathodes of diodes 34B and 36B through Zener diode 218. The diodes 214 and 216, as in the previous embodiments, serve to dissipate any energy stored in the windings of transformers 210 and 212.

In order to prevent a build-up of voltage on capacitor 166 which would alter the operational characteristics of the circuit, a diode 220, comprising a direct current clamp, is connected to the junction of resistors 222 and 224. Resistors 222 and 224 are included in a voltage divider comprising resistor 226, the resistors 222 and 224, resistor 228 and diodes 230 and 232. The junction of resistors 224 and 228 is connected to the high potential side of capacitor 184, through diode 234 as shown. This establishes the initial or quiescent voltage level on capacitor 184. Resistor 226 is connected to Zener diode 236 which serves the same function as Zener diode 94 in the circuit of FIG. 3. That is, it compensates for line voltage variations and establishes a fixed voltage source for the comparator circuitry.

Since the characteristics of transistor 152 and diode 174 will vary with temperature variations, diodes 180, 230, 232 and 234 are included in the circuit to compensate for this effect.

We claim as our invention:

1. In apparatus for producing at least one train of pulses during each cycle of an input alternating current voltage, and wherein the phase relationship of the first pulse in each train with respect to the starting point of a cycle of said alternating current voltage may be varied; the combination of an oscillator having a normally cutoff transistor therein and adapted to produce said train of pulses when the transistor is rendered conductive during a cycle of said alternating current voltage, a capacitor, means for charging said capacitor at least once during each cycle of said alternating current voltage, a bidirectional current path connecting one terminal of said capacitor to the base of said transistor whereby the transistor will be rendered conductive when the voltage across the capacitor exceeds a predetermined magnitude, and means for controlling the time during a cycle of said alternating current voltage required to charge the capacitor to a voltage exceeding said predetermined magnitude.

2. In apparatus for producing at least one train of pulses during each cycle of an input alternating current voltage, and wherein the phase relationship of the first pulse in each train with respect to the starting point of a cycle of said alternating current voltage may be varied; the combination of an oscillator having a normally cutoff transistor therein and adapted to produce said train of pulses when the transistor is rendered conductive during a cycle of said alternating current voltage, a capacitor, means for charging said capacitor at least once during each cycle of said alternating current poltage, a bidirectional current path connecting one terminal of said capacitor to the base of said transistor such that the transistor will conduct when the voltage across the capacitor exceeds a predetermined magnitude, means for controlling the time required to charge said capacitor to a voltage exceeding said predetermined magnitude, and means for discharging said capacitor at least once during each cycle of said alternating current voltage, said latter-mentioned means including a discharge path for the capacitor, a semiconductive device in said discharge path, means for blocking current flow through the semiconductive device during the time that the capacitor is charged, and means for rendering said semiconductive device conductive during discharge of said capacitor.

3. In apparatus for producing at least one train of pulses during each cycle of an input alternating current voltage, and wherein the phase relationship of the first pulse in each train with respect to the starting point of a cycle of said alternating current voltage may be varied; the combination of an oscillator having a normally cutoff transistor therein and adapted to produce said train of pulses when the transistor is rendered conductive during a cycle of said alternating current voltage, a rectifier for rectifying a portion of said alternating current voltage, a resistor and a capacitor connected in series across the output of said rectifier, means for discharging said capacitor only at the zero crossings of said alternating current voltage such that the capacitor will charge between zero crossings of the alternating current voltage, means for rendering said transistor conductive when the voltage across the capacitor exceeds a predetermined magnitude as it charges between zero crossings of the alternating current voltage, and means for controlling the time during each half cycle of said alternating current voltage required to charge the capacitor to a voltage exceeding said predetermined magnitude.

4. The apparatus of claim 3 wherein the means for controlling the time during a cycle of said alternating current voltage required to charge the capacitor to a voltage exceeding said predetermined magnitude includes a unidirectional current device and a resistor connected in shunt with said capacitor, means for applying a source of control voltage across said latter-mentioned resistor, and means for reverse biasing said unidirectional current device at all times except at the zero crossings of said alternating current voltage whereby the capacitor will discharge through the unidirectional current device to a voltage level determined by the voltage established across said latter-mentioned resistor by the control voltage.

5. In apparatus for producing at least one train of pulses during each cycle of an input alternating current voltage, and wherein the phase relationship of the first pulse in each train with respect to the starting point of a cycle of said alternating current voltage may be varied; the combination of an oscillator having a normally cutoff transistor therein and adapted to produce said train of pulses when the transistor is rendered conductive during a cycle of said alternating current voltage, transformer means having primary and secondary windings, means for applying said source of alternating current voltage across said primary winding, first and second diodes having their anodes connected to opposite ends of said secondary winding, a third diode and a first capacitor connected in series between the cathodes of the first and second diodes and a center tap on said secondary winding, the anode of the third diode being connected to the cathode of the first and second diodes and the cathode of the third diode being connected to said first capacitor, a first resistor and a second capacitor connected in series between the cathode of the third diode and the center tap on said secondary winding, second and third resistors connected in series between the cathodes of said first and second diodes and the center tap on said secondary winding, a fourth diode having its anode connected to the junction of said first resistor and second capacitor and its cathode connected to the junction of said second and third resistors such that the fourth diode will be reverse biased at all times except during zero crossings of said alternating current voltage when said second capacitor discharges through the third resistor, means for applying a control voltage across said third resistor whereby the level which said second capacitor discharges at the zero crossings of the alternating current voltage will be dependent upon the magnitude of the control voltage, and means connecting the anode of said fourth diode to the base of the transistor in said oscillator whereby the transistor will conduct when the voltage across said second capacitor exceeds a predetermined magnitude as it charges between zero crossings of the alternating current voltage.

6. The apparatus of claim 5 wherein the means of applying the control voltage across said third resistor comprises a diode and capacitor connected in shunt across the third resistor, and wherein the control voltage is applied across said capacitor.

7. In apparatus for producing at least one train of pulses during each cycle of an input alternating current voltage, and wherein the phase relationship of the first pulse in each train with respect to the starting point of a cycle of said alternating current voltage may be varied; the combination of an oscillator having a normally cutoff transistor therein and adapted to produce said train of pulses when the transistor is rendered conductive during a cycle of said alternating current voltage, a surce of driving potential for said oscillator, a capacitor, means for charging said capacitor from said source of driving potential at least once during each cycle of said alternating current voltage, means including a bidirectional current path connecting said capacitor to the base of said transistor whereby the transistor will be rendered conductive when the voltage across the capacitor exceeds the base-to-emitter drop of said transistor, and means for establishing a voltage on said emitter comprising a resistor and a second capacitor connected in series across said source of driving potential, a resistor in shunt with said second capacitor, and means connecting the high potential side of said capacitor to the emitter of said transistor.

8. In apparatus for producing at least one train of pulses during each cycle of an input alternating current voltage, and wherein the phase relationship of the first pulse in each train with respect to the starting point of a cycle of said alternating current voltage may be varied; the combination of an oscillator having a normally cutoff transistor therein and adapted to produce said train of pulses when the transistor is rendered conductive during a cycle of said alternating current voltage may be varied; the combination of an oscillator having a normally cutoff transistor therein and adapted to produce said train of pulses when the transistor is rendered conductive during a cycle of said alternating current voltage, a source of driving potential for said oscillator, means including the primary winding of a transformer connecting the collector of said transistor to the positive terminal of said source of driving potential, a resistor and a first capacitor in parallel connecting the emitter of said transistor to the negative terminal of the source of driving potential, a resistor connecting said emitter to the positive terminal of said source of driving potential whereby said first capacitor will be charged to normally establish a cutoff potential on the emitter of said transistor, a second capacitor, means for charging said capacitor from the source of driving potential at least once during each cycle of said alternating current voltage, a resistor and a secondary winding on said transformer connecting said capacitor to the base of said transistor whereby the transistor will conduct to produce oscillations across said primary winding when the voltage across said second capacitor exceeds that across the first capacitor by the base-to-emitter drop of the transistor, and means for controlling the time during a cycle of said alternating current voltage required to charge the second capacitor to a voltage exceeding that on the first capacitor by the base-to-emitter drop of the transistor.

9. In apparatus for producing at least one train of pulses during each cycle of an input alternating current voltage, and wherein the phase relationship of the first pulse in each train with respect to the starting point of a cycle of said alternating current voltage may be varied; the combination of transformer means having primary and secondary windings, means for applying said source of alternating current voltage across said primary winding, first and second diodes having their anodes connected to opposite ends of said secondary winding, a third diode and a first capacitor connected in series between the cathode of the first and second diodes and a center tap on said secondary winding, the anode of the third diode being connected to the cathodes of the first and second diodes and the cathode of the third diode being connected to said first capacitor, a first resistor and a second capacitor connected in series between the cathode of the third diode and the center tap on said secondary winding, second and third resistors connected in series between the cathodes of said first and second diodes and the center tap on said secondary winding, a fourth diode having its anode connected to the junction of said first resistor and second capacitor and its cathode connected to the junction of said second and third resistors such that the fourth diode will be reverse biased at all times except during zero crossings of said alternating current voltage when said second capacitor discharges through the third resistor, means for applying a control voltage across said third resistor whereby the level to which said second capacitor discharges at the zero crossings of said alternating current voltage when said second capacitor discharges through the third resistor, means for applying a control voltage across said third resistor whereby the level to which said second capacitor discharges at the zero crossings of the alternating current voltage will be dependent upon the magnitude of the control voltage, an oscillator having a normally cutoff transistor therein and adapted to produce said train of pulses when the transistor is rendered conductive during a cycle of said alternating current voltage, means including the primary winding of a transformer device connecting the collector of said transistor to the cathode of said third diode, a fourth resistor and a third capacitor in parallel connecting the emitter of said transistor to the center tap of the secondary winding of said first-mentioned transformer means, a fifth resistor connecting said emitter to the cathode of said third diode whereby the third capacitor will be charged to normally establish a cutoff potential on the emitter of said transistor, and a sixth resistor and a secondary winding on said transformer device connecting the junction of said first resistor and second capacitor to the base of said transistor whereby the transistor will conduct to produce oscillations across said primary winding when the voltage across the second capacitor exceeds that across the fourth capacitor by the base-to-emitter drop of the transistor.

10. The apparatus of claim 9 wherein the high potential side of said fifth resistor is connected to the center tap of the secondary winding on said transformer means through a Zener diode, and including a seventh resistor and a Zener diode connecting the collector of said transistor to the cathode of said third diode.

11. The apparatus of claim 9 and including a fifth capacitor connected in shunt with said sixth resistor.

12. In apparatus for producing at least one train of pulses during each cycle of an input alternating current voltage, and wherein the phase relationship of the first pulse in each train with respect to the starting point of a cycle of said alternating current voltage may be varied; the combination of an oscillator having a normally cutoff transistor therein and adapted to produce said train of pulses when the transistor is rendered conductive during a cycle of said alternating current voltage, transformer means having primary and secondary windings, means for applying said source of alternating current voltage across said primary winding, first and second diodes having their anodes connected to opposite ends of said secondary winding, a third diode and a first capacitor connected in series between the cathodes of the first and second diodes and a center tap on said secondary winding, the anode of the third diode being connected to the cathodes of the first and second diodes and the cathode of the third diode being connected to said first capacitor, means including an impedance element and a second capacitor connected in series between the cathode of the third diode and the center tap on said secondary winding, a transistor device having its emitter and collector connected to opposite sides of said second capacitor, a connection between the base of said transistor and the cathodes of said first and second diodes, unidirectional current devices connecting the base of said transistor to the anodes of said first and second diodes respectively, and a connection between said second capacitor and the base of the normally cutoff transistor in said oscillator.

13. The apparatus of claim 12 including a diode and a resistor connected in series with said capacitor, and means for applying a source of control voltage across said resistor to thereby establish the voltage level to which said capacitor discharges upon conduction of said transistor in shunt with the capacitor at the zero crossings of said alternating current voltage source.

14. In a phase control alternating current power supply system including a first semiconductive controlled rectifier adapted to fire on one-half cycle of an alternating current voltage source and a second semiconductive controlled rectifier adapted to fire on the other half cycle of the alternating current voltage source, the combination of an oscillator including a normally cutoff semiconductive device of the type having an emitter electrode, a collector electrode, and a base electrode, transformer means inductively coupling said base electrode with one of the remaining two electrodes whereby a positive feedback voltage is derived to cause oscillations in the semiconductive device, a capacitor, means for charging said capacitor at least once during each half cycle of said alternating current voltage source, means for rendering said semiconductive device conductive when the voltage across the capacitor exceeds a predetermined magnitude, means for controlling the time during a cycle of said alternating current voltage source required to charge the capacitor to a voltage exceeding said predetermined magnitude, a pair of amplifying transistors, means including secondary winding means on the transformer means for applying the oscillations produced by said oscillator to one of said amplifying transistors during one-half cycle of the alternating current voltage source and to the other amplifying transistor during the other half cycle of the alternating current voltage source, means for applying the amplified oscillations at the output of one of said amplifying transistors to said first semiconductive controlled rectifier to render it conducting, and means for applying the amplified oscillations at the output of the other amplifying transistor to the second semiconductive controlled rectifier to render it conductive.

15. The system of claim 14 wherein each of said amplifying transistors has an emitter, a collector and a base, first and second coupling transformers, means including a primary winding on the first of said coupling transformers connecting the collector of one of the amplifying transistors to the positive terminal of a source of deriving potential, means including a primary winding on the second of said coupling transformers connecting the collector of the other amplifying transistor to the positive terminal of said source of driving potential, a single diode connecting the emitters of both of the amplifying transistors to the negative terminal of said source of driving potential, gate means for applying oscillations produced by said oscillator to the base of one and then the other of said amplifying transistors during alternate half cycles of said alternating current voltage source, and secondary windings on said latter-mentioned first and second coupling transformers for applying amplified oscillations to the first and second semiconductive controlled rectifiers respectively.

16. In a phase controlled alternating current power supply system including a first semiconductive controlled rectifier adapted to fire on one-half cycle of semiconductive controlled rectifier adapted to fire on the other half cycle of the alternating current voltage source; the combination of an oscillator having a normally cutoff semiconductive device of the type having an emitter electrode, a collector electrode and a base electrode, transformer means inductively coupling said base electrode with one of the remaining two electrodes whereby a positive feedback voltage is derived to cause oscillations in the semiconductive device, a capacitor, means for charging said capacitor at least once during each half cycle of said alternating current voltage source, means for rendering said semiconductive device conductive when the voltage across the capacitor exceeds a predetermined magnitude, means for controlling the time during a cycle of said alternating current voltage source required to charge the capacitor to a voltage exceeding said predetermined magnitude, a pair of amplifying transistors, a secondary winding on said transformer means, a first pair of diodes connecting one end of said secondary winding to the base of one of said amplifying transistors, a second pair of diodes connecting said one end of the secondary winding to the base of the other of said amplifying transistors, each pair of diodes having their anodes interconnected, means for applying a cutoff potential to the anodes of one pair of diodes during one-half cycle of said alternating current voltage while applying a cutoff potential to the anodes of the other pair of diodes during the other half cycle of the alternating current voltage source whereby oscillations appearing across said secondary winding will be applied to one amplifying transistor during one-half cycle of the alternating current voltage source and to the other amplifying transistor during the other half cycle of the alternating current voltage source, means for applying the amplified oscillations at the output of one of said amplifying transistors to said first semiconductive controlled rectifier to render it conducting, and means for applying the amplified oscillations at the output of the other amplifying transistor to the second semiconductive controlled rectifier to render it conductive.

17. In a phase controlled alternating current power supply system including a first semiconductive controlled rectifier adapted to fire on one-half cycle of an alternating current voltage source and a second semiconductive controlled rectifier adapted to fire on the other half cycle of the alternating current voltage source; the combination of an oscillator including a normally cutoff semiconductive device of the type having an emitter electrode, a collector electrode, and a base electrode, transformer means inductively coupling said base electrode with one of the remaining two electrodes whereby a positive feedback voltage is derived to cause oscillations in the semiconductive device, a capacitor, means for charging said capacitor at least once during each cycle of said alternating current voltage source, means for rendering said semiconductive device conductive when the voltage across the capacitor exceeds a predetermined magnitude, means for controlling the time during a cycle of said alternating current voltage source required to charge the capacitor to a voltage exceeding said predetermined magnitude, a pair of amplifying transistors, means including first and second secondary windings on the transformer means for applying oscillations produced by said oscillator to one of said amplifying transistors during one-half cycle of the alternating current voltage source and to the other amplifying transistor during the other half cycle of the alternating current voltage source, a unidirectional current device connecting one of said secondary windings to the base of one of said amplifying transistors, a unidirectional current device connecting the other of said secondary windings to the base of the other of the amplifying transistors, means for applying amplified oscillations at the output of one of said amplifying transistors to said first semiconductive controlled rectifier to render it conducting, and means for applying the amplified oscillations at the output of the other amplifying transistor to the second semiconductive controlled rectifier to render it conductive.

No references cited.

ARTHUR GAUSS, *Primary Examiner.*

R. H. PLOTKIN, *Assistant Examiner.*